United States Patent
Tobin

(10) Patent No.: US 7,577,965 B2
(45) Date of Patent: Aug. 18, 2009

(54) PUSH-BASED OBJECT REQUEST BROKER

(75) Inventor: Kevin J. Tobin, Richmond Hill (CA)

(73) Assignee: Alcatel, Paris (FR)

( * ) Notice: Subject to any disclaimer, the term of this patent is extended or adjusted under 35 U.S.C. 154(b) by 604 days.

(21) Appl. No.: 10/756,332

(22) Filed: Jan. 14, 2004

(65) Prior Publication Data

US 2004/0187141 A1    Sep. 23, 2004

Related U.S. Application Data

(60) Provisional application No. 60/440,025, filed on Jan. 15, 2003.

(51) Int. Cl.
*G06F 3/00* (2006.01)
*G06F 9/44* (2006.01)
*G06F 9/46* (2006.01)
*G06F 13/00* (2006.01)

(52) U.S. Cl. .................. 719/330; 719/316; 717/108

(58) Field of Classification Search ......... 719/310–328, 719/330; 717/108
See application file for complete search history.

(56) References Cited

U.S. PATENT DOCUMENTS

| | | | | |
|---|---|---|---|---|
| 5,787,437 | A * | 7/1998 | Potterveld et al. | 707/103 R |
| 5,920,725 | A | 7/1999 | Ma et al. | |
| 6,018,628 | A * | 1/2000 | Stoutamire | 717/147 |
| 6,018,805 | A | 1/2000 | Ma et al. | |
| 6,085,030 | A | 7/2000 | Whitehead et al. | |
| 6,115,646 | A * | 9/2000 | Fiszman et al. | 700/181 |
| 6,148,339 | A * | 11/2000 | Nagamatsu et al. | 709/224 |
| 6,199,195 | B1 * | 3/2001 | Goodwin et al. | 717/104 |
| 6,230,160 | B1 | 5/2001 | Chan et al. | |
| 6,298,391 | B1 * | 10/2001 | Kennedy et al. | 719/328 |
| 6,343,332 | B1 * | 1/2002 | Ueda | 719/320 |
| 6,377,975 | B1 | 4/2002 | Florman | |
| 6,499,137 | B1 | 12/2002 | Hunt | |
| 6,501,486 | B1 * | 12/2002 | Lau | 715/762 |

(Continued)

FOREIGN PATENT DOCUMENTS

WO    2004/063838 A3    7/2004

OTHER PUBLICATIONS

Michi Henning, Steve Vinoski: "Advanced CORGA Programming with C++", 1999, Addison-Wesley, XP002302416 p. 1009-1010.

(Continued)

*Primary Examiner*—Li B Zhen
*Assistant Examiner*—KimbleAnn Verdi
(74) *Attorney, Agent, or Firm*—Sughrue Mion, PLLC

(57) ABSTRACT

An object request broker abstraction layer and a method for allowing remote access to a server object via custom interface. The object request broker abstraction layer includes a custom interface, a template with instructions on how to produce source code and a code generator with a set of library routines. This code generator produces a client side and a server side code to allow for creation and access to server objects through non-generic interfaces. This can be carried out through the following method obtaining a template instructing a code generator to produce source code for a client and a server, reading user-defined interface and generating source code for this interface. This generated source code implements a push-based distribution through this user-defined, non-generic interface.

12 Claims, 4 Drawing Sheets

U.S. PATENT DOCUMENTS

| | | |
|---|---|---|
| 6,542,908 B1 | 4/2003 | Ims |
| 6,574,635 B2 | 6/2003 | Stauber et al. |
| 6,594,682 B2 * | 7/2003 | Peterson et al. .............. 718/102 |
| 6,640,255 B1 * | 10/2003 | Snyder et al. ................ 719/315 |
| 6,701,381 B2 * | 3/2004 | Hearne et al. ................ 719/313 |
| 6,751,798 B1 * | 6/2004 | Schofield ..................... 719/330 |
| 6,901,596 B1 | 5/2005 | Galloway ..................... 719/330 |
| 6,912,718 B1 * | 6/2005 | Chang et al. ................. 719/318 |
| 6,934,709 B2 * | 8/2005 | Tewksbary .................... 707/10 |
| 7,171,672 B2 * | 1/2007 | Just ............................ 719/330 |
| 2001/0010053 A1 | 7/2001 | Ben-Shachar et al. |
| 2001/0052113 A1 | 12/2001 | Hearne et al. |
| 2002/0010803 A1 | 1/2002 | Oberstein et al. |
| 2002/0019843 A1 | 2/2002 | Killian et al. |
| 2002/0078256 A1 * | 6/2002 | Gehman et al. .............. 709/318 |
| 2002/0087739 A1 * | 7/2002 | Mazza ........................ 709/316 |
| 2003/0018766 A1 | 1/2003 | Duvvuru |
| 2003/0074484 A1 | 4/2003 | Cheng et al. |
| 2003/0093551 A1 | 5/2003 | Taylor et al. |
| 2003/0167358 A1 * | 9/2003 | Marvin et al. ................ 709/328 |
| 2003/0182457 A1 * | 9/2003 | Brewin ........................ 709/310 |
| 2004/0015898 A1 * | 1/2004 | Tewksbary ................... 717/140 |
| 2004/0243974 A1 * | 12/2004 | Gardas et al. ................ 717/106 |
| 2005/0273792 A1 * | 12/2005 | Inohara et al. ............... 719/330 |

OTHER PUBLICATIONS

Erich Gamma, Richard Helm, Ralph Johnson, John Vlissides: "Design Patterns: Elements of Reusable Object-Oriented Software" 1995, pp. 296-300, Addison-Wesley, XP002382762.

Bjarne Stroustup: "Die C++—Programmiersprache" 1992, pp. 276-279, Addison-Wesley.

* cited by examiner

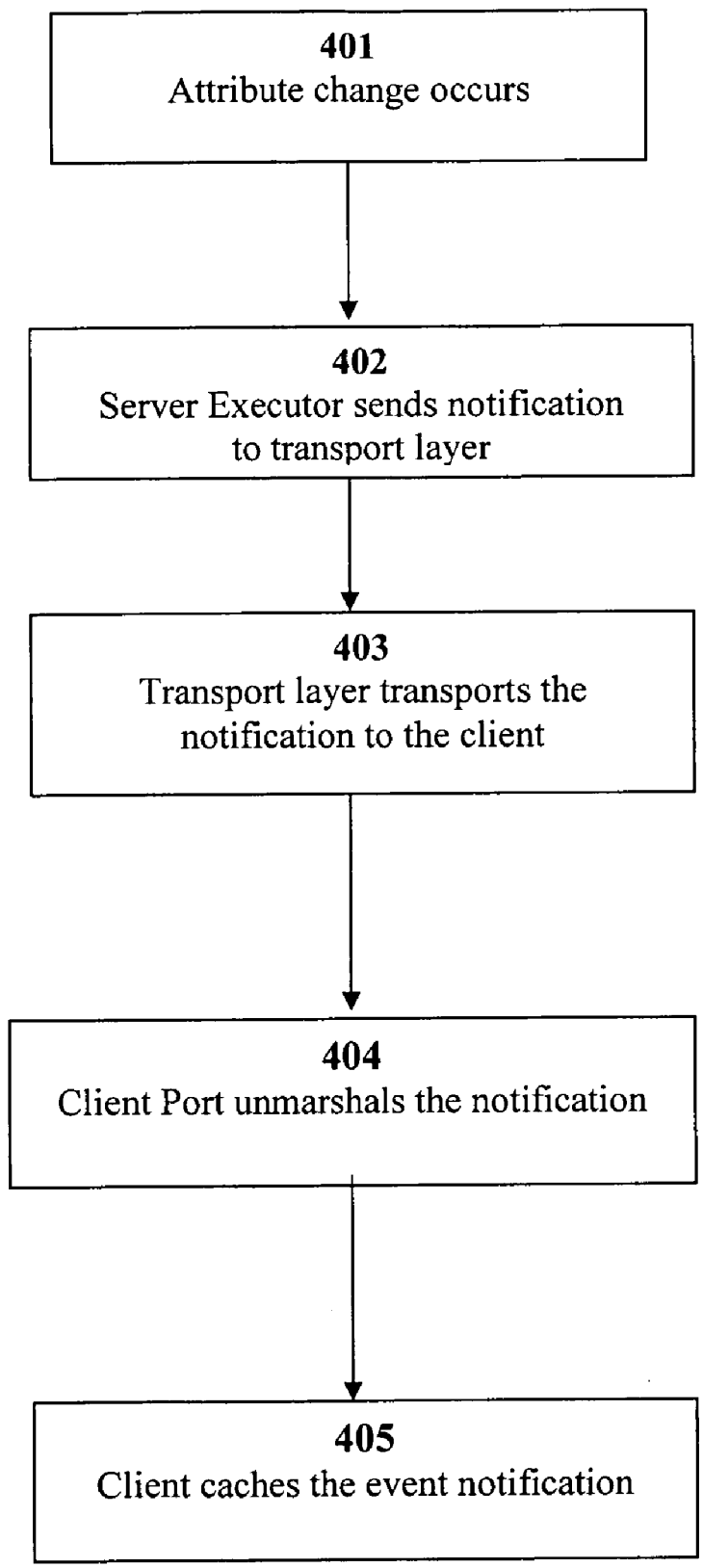

PUSH-BASED OBJECT REQUEST BROKER

This application claims the benefit of U.S. Provisional Patent Application No. 60/440,025, titled "ORBAL: a Push-Based Object Request Broker" filed on Jan. 15, 2003, the disclosures of which is incorporated by reference in its entirety.

BACKGROUND OF THE INVENTION

1. Field of the Invention

Systems and methods consistent with the present invention relate to an object request broker for event notification. More particularly, the present invention is consistent with providing automatic generation of code with the generated code thereafter being compilable so as to provide multiple remote clients in distributed computing access to server object events.

2. Description of the Related Art

The widespread deployment of computer networks has significantly expanded the usefulness of personal computers (PC's). Explosive growth in the world-wide web of the Internet has been followed by large database applications once cloistered on internal mainframe computers migrating to smaller, less-expensive server workstations and PCs. Distributed computing has reduced the computing burden on central servers by partitioning software applications across server and client machines. In distributed computing, the machines on which the client and server programs execute are different and are connected through a network such as the Internet, or a corporate Intranet or Extranet. Both the client and server machines must use a standard communications protocol, in order to communicate with each other.

One conventional protocol used with client/server computing is the Remote Procedure Call ("RPC"). With RPC, a programmer codes a module (e.g., procedure call) but only a "stub" for that module is generated during program compilation. A "stub" is a special construct enabling the program to successfully compile without resolving the address of the referenced procedure. If the procedure is actually called during runtime, a request to execute the code will be forwarded to a server where the module is available. That server will perform the function of the procedure, and return the results transparently to the client.

More sophisticated distributed-computing models and applications use an object-oriented approach with larger applications being divided into small containers or "objects" of program code and data. The program objects are distributed to both the server and the clients, with the details of network communication hidden from objects through the use of proxy and stub objects, which transfer information over the network. Object Management Group's Common Object Request Broker Architecture (CORBA) and Microsoft's Distributed Component Object Model (DCOM) are two competing standards for distributed computing.

CORBA, for example, is comprised of objects, where for each object type, there is an interface and an implementation code for accessing a particular object type. As shown in FIG. 1, an interface contains a list of attributes 1, 2 . . . n (e.g., name, social security number, date of birth) and a list of methods 1, 2 . . . n (e.g., get_social_security( ); change_social_security ( ); add_social_security( )) to be invoked for that particular object type. An interface is defined in an Interface Definition Language (IDL), which provides for encapsulation, polymorphism, and inheritance. The interface is the syntax part of the contract that the server object offers to the clients that invoke it. Any client that wants to invoke an operation on the object must use this IDL interface to specify the operation it wants to perform, and to marshal the arguments that it sends. When the invocation reaches the target object, the same interface definition is used there to unmarshal the arguments so that the object can perform the requested operation with them. The interface definition is then used to marshal the results for their trip back, and to unmarshal them when they reach their destination.

An IDL CORBA tool, as shown in FIG. 1 uses this IDL file to create stubs and skeletons, which serve as proxies for clients and servers, respectively. The IDL is independent of programming language and maps to all of the popular programming languages. Because IDL defines interfaces so strictly, the stub on the client side has no trouble meshing perfectly with the skeleton on the server side, even if the two are compiled into different programming languages, or even running on different server platforms. For example, object implementations 1, 2 . . . n are located separately, as shown in FIG. 1 (e.g. on a remote servers) from the interfaces.

Sometimes to facilitate development of distributed computing, code generators are used. For example, U.S. Pat. No. 6,199,195 to Goodwin et al. teaches a code generator, which is a model driven application that reads the object elements from a schema server which makes available meta information defining a particular data system or database and applies a set of known service templates for a given framework to an object's elements to produce a set of source code. This code generator can generate code in different languages (e.g. C++, Java) based on user preferences and selection. The code generator also generates CORBA ORB services for specific operations which will replace client stubs. This reference is incorporated herein by reference for its helpful background information.

An object request broker (ORB) provides a mechanism for communicating client requests to the target object implementation, as shown in FIG. 1. The ORB takes care of all of the details involved in routing a request from client to object, and routing the response to its destination. The ORB finds the object implementation and delivers it to a client; thus making the process transparent to the client. Clients use the object references as shown in FIG. 1, e.g. person.get_social_security("John Smith"), to direct their invocations, identifying to the ORB the exact instance they want to invoke. Passing through the stub on the client side, the invocation continues through the ORB. If the ORB identifies that the object implementation is on a remote server, then ORB routes the request over a standard protocol, e.g., IIOP (Internet Interoperable ORB Protocol), GIOP (General Interoperable ORB Protocol, implemented over TCP), to the ORB of that remote object. The ORB of the remote object implementation passes the request to the skeleton and the skeleton on the implementation side, gets to the object where it is executed. This ORB creates client transparency.

In general, CORBA uses a pull based object distribution to fetch the attributes via their interfaces. That is, the request always originates at the client. However, push-based event notification is also available but only for generic/standard interfaces (e.g. interface for a "string" type) or interfaces of type any.

CORBA Event Model

Events are produced by suppliers and consumed by consumers. Suppliers and consumers are completely decoupled: a supplier has no knowledge of the number of consumers or their identities, and consumers have no knowledge of which supplier generated a given event.

In order to support this model, the CORBA Event Service introduces to CORBA a new architectural element, called an event channel. As shown in FIG. 2, an event channel mediates the transfer of events between the suppliers and consumers as follows:

1. The event channel allows consumers to register interest in events, and stores this registration information at step 201.
2. As an event occurs, the supplier sends event notification to the channel at step 202.
3. The channel accepts incoming events from suppliers at step 203.
4. The channel forwards supplier-generated events to registered consumers at step 204.

Suppliers and consumers connect to the event channel and not directly to each other. From a supplier's perspective, the event channel appears as a single consumer; from a consumer's perspective, the event channel appears as a single supplier. In this way, the event channel decouples suppliers and consumers.

There are two types of event suppliers: Publishers and Emitters.

Event Source: Publisher

An event originates at an event publisher and is transferred to any number of event consumers. A publisher is guaranteed to be the only source publishing events to that channel.

Event Source: Emitter

An event originates at the event emitter and is transferred to a single consumer. Only one consumer can subscribe to receive events from the emitter. However, multiple emitters can use the same event channel simultaneously. Event communication can take one of two forms, typed or untyped.

Untyped Events

In untyped event communication, an event is propagated by a series of generic push( ) or pull( ) operation calls. The push( ) operation takes a single parameter which stores the event data. The event data parameter is of type any, which allows any IDL defined data type to be passed between suppliers and consumers. The pull( ) operation has no parameters but transmits event data in its return value, which is also of type any. Clearly, in both cases, push( ) or pull( ), the supplier and consumer applications must agree about the contents of the any parameter and return a value if this data is to be useful.

Typed Events

In typed event communication, a programmer defines application-specific IDL interfaces through which events are propagated. Rather than using push( ) and pull( ) operations and transmitting data using a type any, a programmer defines an interface that suppliers and consumers use for the purpose of event communication. The operations defined on the interface may contain parameters defined in any suitable IDL data type. In the Push model, event communication is initiated simply by invoking operations defined on this interface. The Pull model is more complex because event communication is initiated by invoking operations on an interface that is specially constructed from the application-specific interface that the programmer defines. Event communication is initiated by invoking operations on the constructed interface.

The form that event communication takes is independent of the method of initiating event transfer. As a consequence, both the Push model and the Pull model can be used to transmit typed events or untyped events. However, CORBA event notification requires the data being sent to be generalized into an encapsulating mechanism (CORBA::any). Object Management Group (OMG) could not have designed a custom, type-safe interface because they cannot anticipate all data types.

For example, consider the following. The user passes a user-defined (custom) structure that contains two fields: a string and an integer. For the purpose of marshalling this value across the network, the event producer should cast this type to type any. Then, the data is being sent over the network to a consumer and the receiving side performs type cast to supposedly original type. However, if the programmer made a mistake and on the client side the data is being cast from type any to a type different than the original type (e.g. double instead of the original structure, which has a string and an integer) it will cause a run-time error. There is no way for this kind of mistake to be detected at compilation-time. CORBA will only detect these mistakes at run-time.

A Distributed Component Object Model is very similar to CORBA. The COM run-time provides object-oriented services to clients and components and uses RPC and the security provider to generate standard network packets that conform to the DCOM wire-protocol standard. However, it too only provides push-based event notification for generic interfaces. In short, accounting for user-defined (non-generic) interfaces has been a challenge in today's technology.

Various techniques have been developed for a Distributed System in attempts to account for heterogeneous software. For example, in U.S. Pat. No. 6,085,030 to Whitehead, a component of server architecture is provided which allows for a distributed interaction between a client and heterogeneous software by registering and locating the components and services in an object neutral global component registry. Similarly, U.S. patent application Ser. No. 09/841,847 to Killian et al. published on Feb. 14, 2002, shows a client-server system including a method using CORBA to register the association between the interface name and the path name of the server executable in the implementation repository, after compilation but before execution. The IDL compiler also generates type information for each method in an interface and stores it in the interface repository. The client can query the interface repository to get runtime information about a particular interface and then use that to create and invoke a method on the object dynamically through the dynamic invocation interface. For another technique using CORBA to allow intelligent components to discover each other in distributed computing, see U.S. patent application Ser. No. 09/816,282 to Ben-Shachar et al. published on Jul. 26, 2001. All of the above mentioned references are incorporated herein by reference for their helpful background information.

However, these techniques just like the pull-based approaches provided by CORBA and DCOM have low scalability. These systems cannot scale to a significant number of clients; they are limited to point-to-point protocols. Using a push-based approach allows communication using one-to-many protocols. Emerging standards for scalable multicast (SRM) can be employed to provide Internet-scale numbers of clients. On the other hand, although the push approach is available, it is implemented only with respect to generic, standard interfaces. This means that there is no static type-safety inherent in user-defined, non-generic, custom interfaces.

Consider the following example of static type safety in a user-defined, custom interface for non-distributed code:
//ITrain is a custom, non-generic interface
//ITrain::GetSpeed( ) returns a variable of a type double
Train*pTrain;
long=pTrain->GetSpeed( );//This will generate a compiler warning GetSpeed( ) method is returning data of type double. However, the returned value is being assigned to variable of type long. This will produce a compilation message.

CORBA uses generic interfaces, which means that similar mistakes will not be detected at the compilation-time but only at run-time. For example, consider the following code:

CORBA::any aVal;
//this is speed taken from an event channel of a variable type double long speed;
if (!(aVal>=speed))//This will compile without warning In this case GetSpeed( ) method returns a value of type any which is being casted to type long. It will not produce a compilation message and the program will compile just fine. But at run-time, the execution of the above fragment will produce a run-time error. There is no way to detect this problem at the compilation-time. In other words, a static type safety concept requires the programmer or the developer to use known static types rather than dynamic variant types (CORBA::any). If these mismatch problems can be detected at compilation-time, it will save a great deal of testing time and effort.

SUMMARY OF THE INVENTION

To solve the above-described problem, it is an aspect of the present invention to provide a system and a method capable of servicing a large number of clients in a distributed network.

To further solve the above-described problem, it is an aspect of the present invention to provide a high degree of server side transparency as opposed to just client side transparency. In addition, it is an aspect of the present invention to allow for a static type safety, inherent in custom interfaces.

According to the present invention, an object request broker abstraction layer for allowing remote access to a server object comprises at least one custom interface, at least one code template having instructions to produce source code for said at least one custom interface and a code generator comprising at least one routine. The code generator produces a client side and a server side source code, which allows creation and access to said server object via at least one custom interface.

Moreover, according to the present invention, a method of generating a client-side port and server-side executor in a distributed system comprises obtaining a template operable to instruct a code generator to produce source code for a client and a server, obtaining a custom interface, and generating said source code for the custom interface. The source code provides a push based distribution through custom interfaces.

Furthermore, according to the present invention, a computer-executable process stored on a computer-readable medium is operable to generate source code in a code generator having a pre-defined interface and a template is provided. This computer executable process comprises obtaining the template having instructions for the code generator, obtaining the interface having custom attributes and generating source code in a high-level language, with the source code implementing remote access to server objects using pre-defined interface.

BRIEF DESCRIPTION OF THE DRAWINGS

In order to understand the invention and to see how it may be carried out in practice, illustrative, non-limiting embodiments will now be described, with reference to the accompanying drawings, in which:

FIG. 4 is a flow chart illustrating the transfer of events between the suppliers and consumers in ORBAL.

DETAILED DESCRIPTION OF THE INVENTION

The present invention will now be described in detail by describing illustrative, non-limiting embodiments thereof with reference to the accompanying drawings.

Object Request Broker Abstraction Layer provides a push-based object distribution by automatically generating code to allow remote access to server objects. In particular, a programmer specifies a custom interfaces in a CORBA IDL file. In addition, code templates, which are implementations of the interfaces without consideration of the data-type of the interfaces with which this template will eventually be used. A custom interface, for example, is a non-standard, non-generic interface. That is, these exemplary, non-limiting interfaces are user-defined as opposed to being predefined, for example, in a CORBA library or interface repository.

Figure 1:
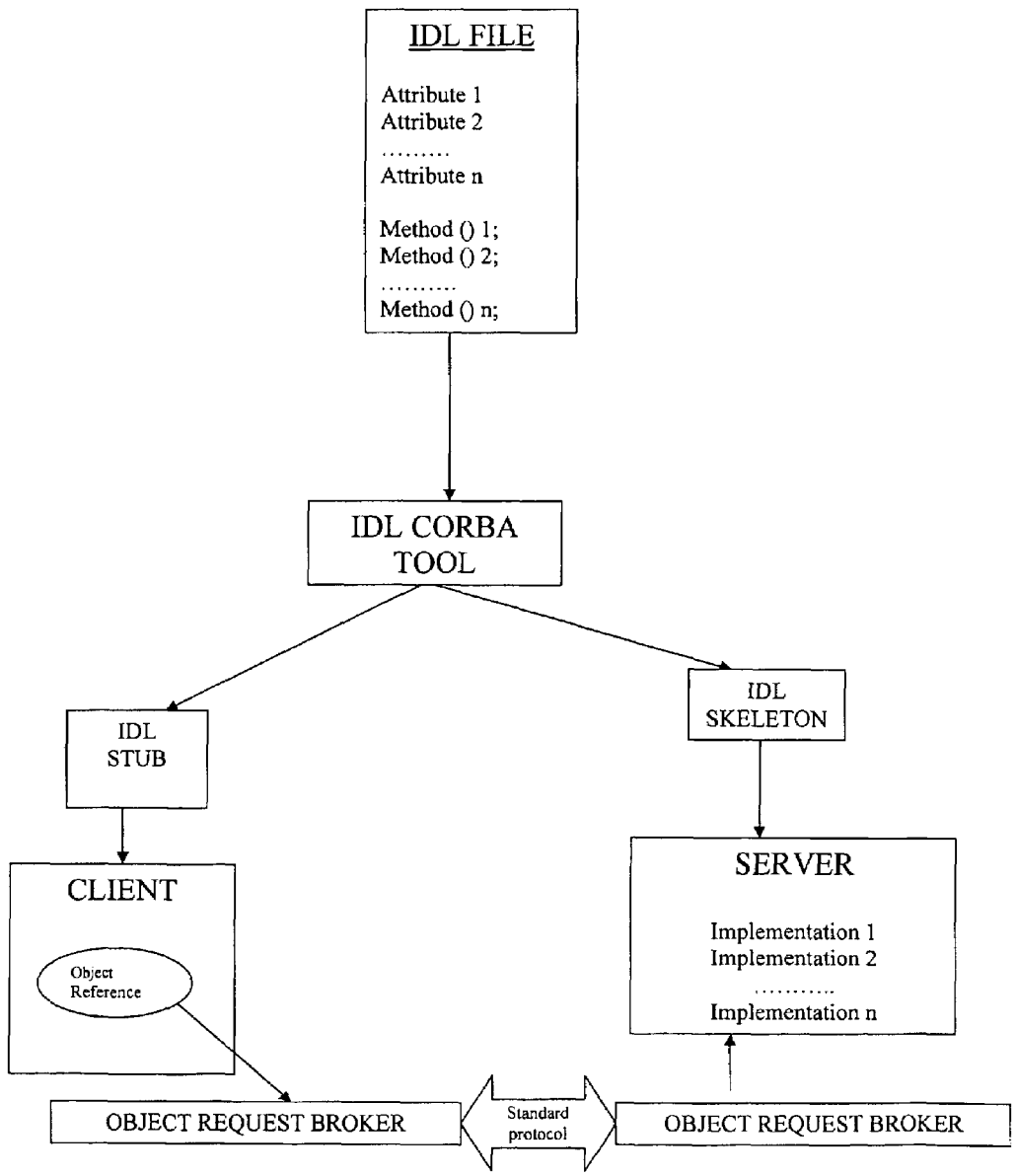
FIG. 1 shows a block diagram illustrating the architecture of CORBA.
Figure 2:
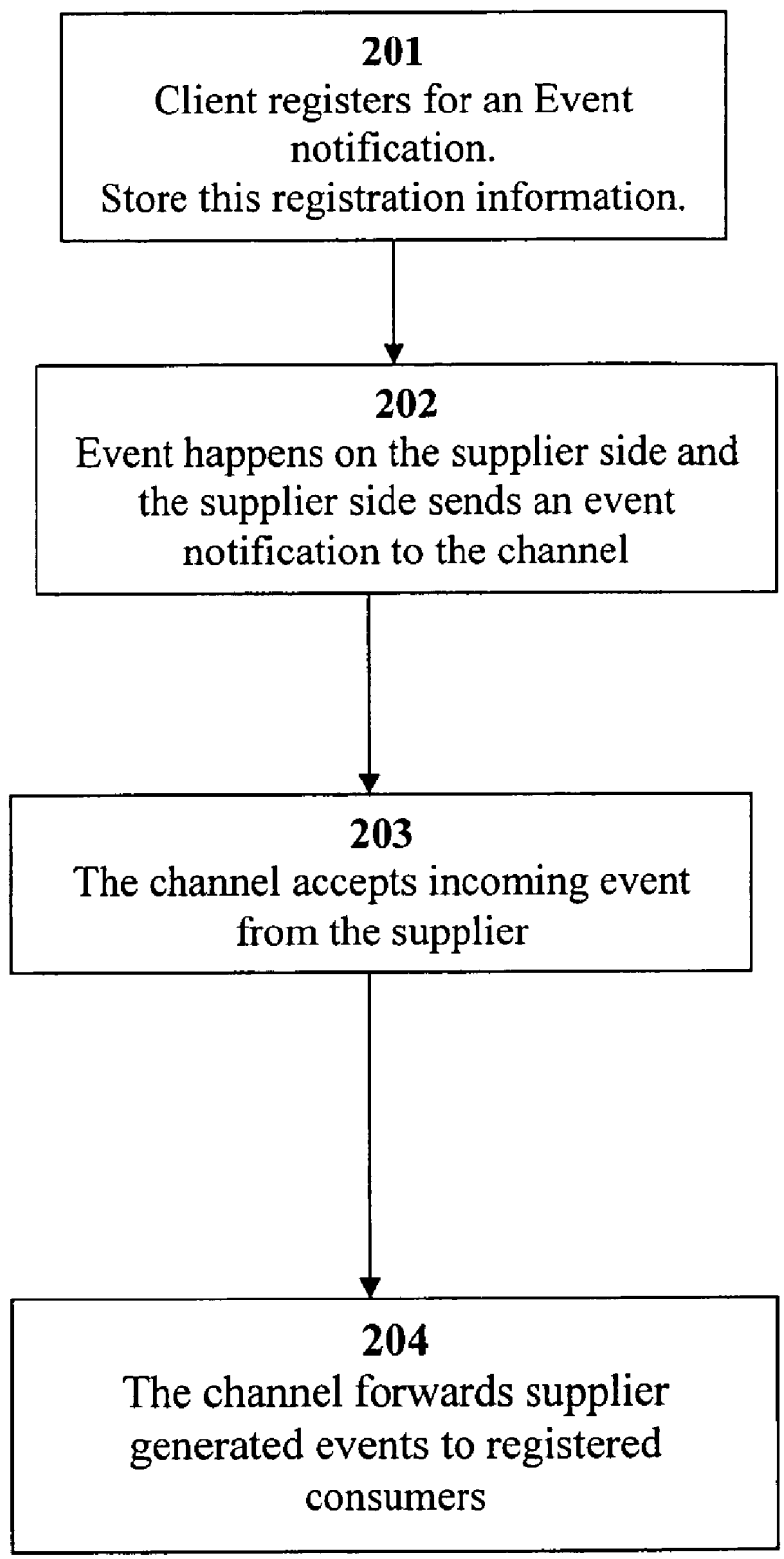
FIG. 2 is a flow chart illustrating the transfer of events between the suppliers and consumers in CORBA.
Figure 3:
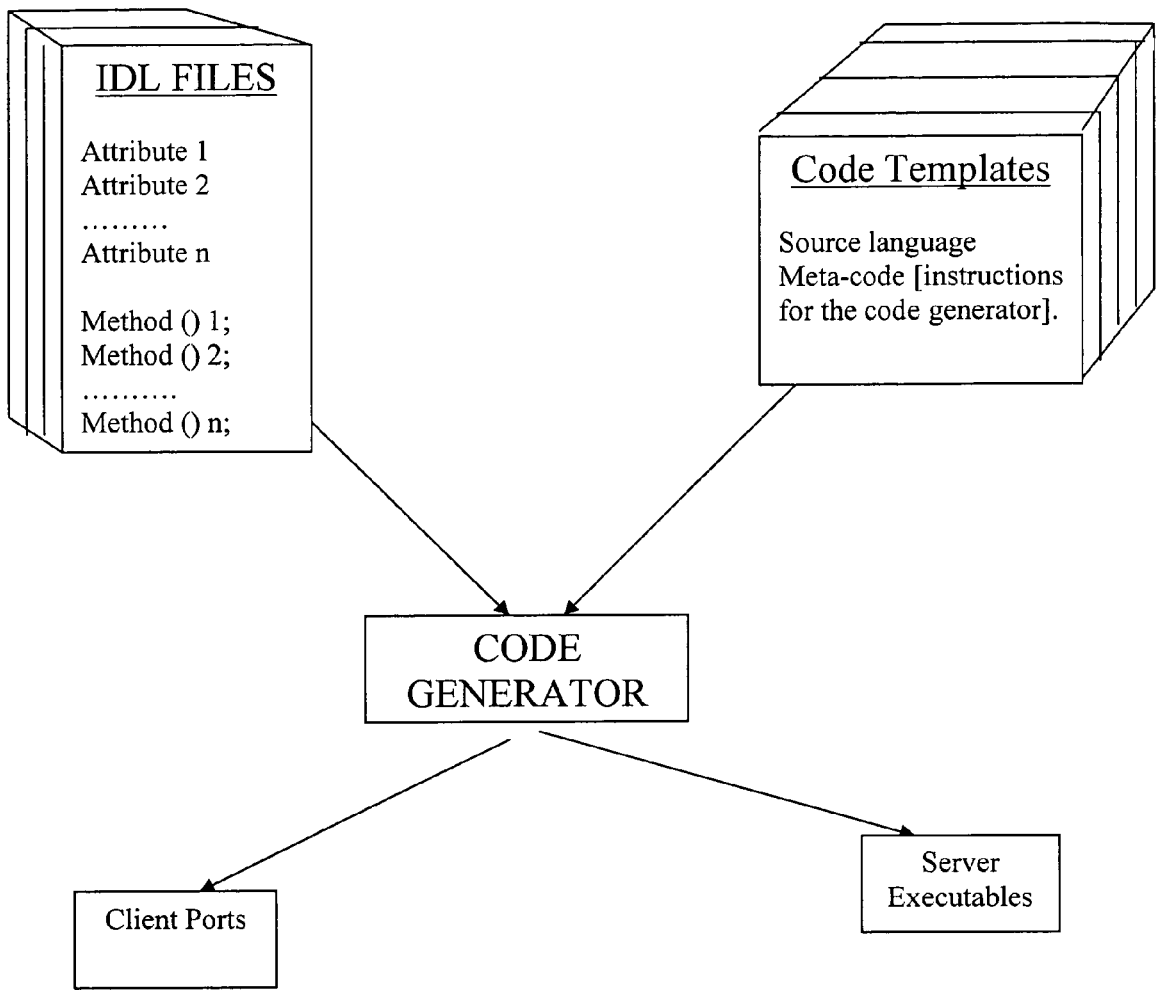
FIG. 3 is a block diagram showing logic blocks of creating ORBAL.

For example, a plurality of event services are defined and stored in code templates "*.tmpl", which are like blank forms (some of the functionality for this template will be filled in by the code generator to enable this push-based routine for custom interfaces) as shown in FIG. 3. The templates simply describe how to generate the appropriate code from the IDL file. The templates contain code for the target source language as well as meta-code, which instructs how the code is to be generated.

Next, the code generator applies the custom or non-generic interfaces stored in the IDL file with a template of event services, thereby producing code for event services for this particular custom interface. The source code generator creates both the server side executables and client side ports.

For example, consider the following snippet that generates client side port implementation:

```
@ foreach interface
@ foreach operation
$retType${className}Port::${opName}($allParams)
$const
{
    @ if ($is_attribute)
    // return the cached value
    return $matchedAttrName;
    @ else
    // Perform a remote call
    PortMsg msgCall;
    // ...
}
@ end
@ end
```

The above mentioned template instructs code generator to produce the client side code for every interface and every attribute (operation) of the interface in the supplied IDL file ("@foreach interface" and "@foreach operation"). Then, there is a general method declaration. That is, "$retType" will be substituted by the code generator with return type for the method described in IDL file, ${className} is the actual interface name (or based on the interface name, e.g. if the interface name is Train then class name can be TrainClass). ${opName} will be substituted with the operation name defined in IDL. $allParams instructs the code generator to put the definition of all passed parameters into the method declaration, (e.g., float TrainPort::GetSpeed(int TrainNumber, double Time), and $const instructs code generator that the state of the object cannot be changed as a result of the execution of called method. Next, it is checked if this is the attribute or actual method. For attribute, its value is being extracted from cache, whereas for the method it is necessary to make an actual remote call.

For the code that generates server side executors, consider the following server-side example:

```
@foreach interface
@foreach attribute
void ${className}Executor::Update$attrName(const $attrType& val)
{
// Marshal attribute for transmission to client
// Provide local notification of update
}
@end
@end
```

Once the code is generated for the server side executables and client side ports, the code is incorporated into clients and servers to provide the following functionality: the server signals an event to all clients registered to receive the notification of the particular event. Clients cache the state changes, and view the event of the object from cache via custom interface associated with this type.

While server side transparency is not addressed in CORBA and DCOM, and the server side application should conform to distributed standards of server side code (e.g. inherit a skeleton etc.) ORBAL produces the code to have high degree of server-side transparency. If the server side code needs to notify registered clients of an event it simply makes a call to SetNotify( ) method of ORBAL layer. In this case the server side code does not even know if this notification is being sent to local (same machine) or distributed clients. As shown in FIG. 4, ORBAL handles these events as follows:

1. The server indicates attribute changes at step 401.
2. ORBAL executor marshals data and sends a message into the transport layer at step 402. ORBAL executor sends an event to local notification implementation.
3. Next, the transport layer such as TCP, UDP or SRM sends data to the client port at step 403.
4. The client port, in its turn unmarshals the data at step 404.
5. Next, the client port caches the data at step 405 and sends event into local notification implementation.

Thus, this provides improved scalability (it can service more clients) because the thread/communication link need not be kept open as is needed in pull based implementations. Alternatively, in a pull based implementation, a communication link can be reestablished every time for the pull operation which will consume excessive network bandwidth. Moreover, since data is cached at the client side, there is client side transparency and/or no need to custom code this specialized behavior (caching), it is automatically generated by the code generator. The invention also provides the advantage of a push-based approach for type-safety custom, user-defined interfaces.

The above and other features of the invention including various and novel details of the process and construction of the parts has been particularly described with reference to the accompanying drawings and pointed out in the claims. It will be understood that the particular process and construction of parts embodying the invention is shown by way of illustration only and not as a limitation of the invention. The principles and features of this invention may be employed in varied and numerous embodiments without departing from the scope of the invention.

The invention claimed is:

1. A computer-readable storage medium storing an object request broker abstraction layer for allowing remote access to a server object, comprising:
   at least one user-defined non-generic interface;
   at least one code template having instructions for a code generator to produce source code for a client and a server, wherein the client side source code comprises at least one generated user-defined non-generic interface for an event emitted from the server; and
   the code generator comprising at least one routine,
   wherein said code generator produces the client side source code and the server side source code in high level language, using the code template and said user-defined non-generic interface, and wherein a variable in the code template is substituted with respective return types for at least one method described in an interface definition file providing a static type safety in the generated user-defined non-generic interface and
   said client side source code and said server side source code allow creation and access to said server object via said generated user-defined non-generic interface, and
   wherein said server side source code notifies a registered remote client by presenting a received event via said generated user-defined non-generic interface; and
   wherein said client side source code caches said received event.

2. The computer-readable storage medium according to claim 1, wherein the code generator is in the abstraction level of the object request broker and wherein the user-defined non-generic interface is a custom interface for the events defined by a user only in IDL language and generated by the code generator.

3. The computer-readable storage medium according to claim 2, wherein the custom interface comprises a push-based event notification custom interface.

4. The computer-readable storage medium according to claim 2, wherein the custom interface is a type-safety interface that presents a push-based object in a CORBA architecture.

5. The computer-readable storage medium according to claim 1, wherein said server side source code notifies a registered remote client of the received event via a CORBA event service and said client side source code caches said received event and wherein functionality to cache the received event is generated by the code generator.

6. The computer-readable storage medium according to claim 1, wherein the generated user-defined non-generic interface comprises non-standard types of parameter that are communicated between the client side source code and the server side source code.

7. A computer-implemented method of generating a client-side port in a client and a server-side executor in a server in a distributed system comprising:
   obtaining a template operable to instruct a code generator to produce source code for a the client and the server, where the client source code comprises a generated user-defined non-generic interface for an event emitted from the server;
   obtaining a user-defined non-generic interface; and
   generating said source code using the template and said user-defined non-generic interface for the client and the server in a high-level language, wherein a variable in the template is substituted with respective return types for at least one method described in an interface definition file providing a static type safety in the generated user-defined non-generic interface, and said source code providing a push based distribution of the event through said generated user-defined non-generic interface;

said client source code implementing caching of a received event in the client.

8. The method according to claim 7, wherein said server source code implements notification of the events to a registered remote client.

9. Computer-executable process stored on a computer-readable storage medium, the computer executable process operable to generate source code in a code generator having a pre-defined by a user interface and a template, said computer executable process comprising:

obtaining said template having instructions for said code generator to produce source code for a client and a server, wherein the client source code comprises a generated pre-defined by the user interface for an event emitted from the server;

obtaining said pre-defined by the user interface having at least one non-generic attribute;

generating by the code generator source code using the template and said pre-defined by the user interface for the client and the server in a high-level language, wherein a variable in the template is substituted with respective return types for at least one method described in an interface definition file providing a static type safety in the generated pre-defined by the user interface, and wherein remote access to server event objects is implemented using said generated source code for the pre-defined by the user interface, said server side source code notifying a registered remote client by presenting a received event via said source code for the pre-defined by the user interface; and the generated source code implementing caching of the received event in the client.

10. The computer-executable process according to claim 9, wherein the generated source code is operable to notify all registered clients of the received event.

11. A computer-implemented method of generating a client-side port in a client and a server-side executor in a server in a distributed system comprising:

obtaining a template operable to instruct a code generator to produce source code for the client and the server, wherein the client source code comprises a generated user-defined non-generic interface for an event emitted from the server;

obtaining a user-defined non-generic interface; and generating said source code using the template and said user-defined non-generic interface for the client and the server in a high-level language, wherein a variable in the template is substituted with respective return types for at least one method described in an interface definition file providing a static type safety in the generated user-defined non-generic interface, and said source code providing a push based distribution of events through said generated user-defined non-generic interface, and said client side source code caching a received event in the client using said generated user-defined non-generic interface.

12. The method according to claim 11, wherein the user-defined non-generic interface is non-standard, custom interface programmed by a user.

* * * * *